Sept. 19, 1967  C. R. BONNELL ET AL  3,342,077

MECHANICAL MOVEMENT

Filed May 13, 1965  2 Sheets-Sheet 1

INVENTORS.
CHARLES R. BONNELL
KENNETH L. McMILLEN
BY Parker & Carter
Attorneys.

3,342,077
MECHANICAL MOVEMENT
Charles R. Bonnell and Kenneth L. McMillen, Wichita, Kans., assignors to Standard Precision, Inc., Wichita, Kans., a corporation of Kansas
Filed May 13, 1965, Ser. No. 455,371
14 Claims. (Cl. 74—89.2)

ABSTRACT OF THE DISCLOSURE

The invention provides an improved mechanical movement for converting relatively small linear movement into relatively large angular movements, or vice versa, all without introducing mechanical hysteresis into the relation between these movements. The mechanism utilizes relative axial motion (the linear movement) between first and second members on the rotary axis (of the angular movement); one of the members includes a rod concentric with the axis, and the other member includes an anchor element offset from the axis. A flexible cable connects the anchor element to a point on the periphery of the rod, and spring means resiliently loads the relative rotation to maintain tension in the cable.

---

This invention is an improvement in mechanical movements and has for one object to translate relatively small linear movement into larger angular movements or vice versa without the use of gears, linkage or any other elements having clearances, back lash or lost motion to be compensated for.

The invention is especially adapted for use in connection with gauges, meters and the like where linear movement of minute extent is for convenience and accuracy in reading translated into angular movement of much greater extent.

Another object of the invention is to provide an arrangement whereby the rectilinear or reciprocating movement of an element or reciprocator responding to variation in conditions may result in the rotation of an indicator or rotator through more than 360 degrees travel, thereby giving increased range and accuracy of indication.

While in many instances the movement of the reciprocator will result in an angular displacement of the rotator, the situation may be reversed and the rotator may be used to cause displacement of the reciprocator.

The invention is herein illustrated as applied to an air speed meter for airplanes and the like but it will be obvious that a device such as this might equally well be employed for many purposes.

In general the invention involves an element, a reciprocator, to which rectilinear movement may be imparted, a rotary member or rotator which is biased to uni-directional movement, held against such movement by a cable and carries an indicating element. The cable resists the angular movement of the rotator under the torque for example of a hair spring. When the reciprocator moves toward the rotator, it pays out the cable, the hair spring rotates the rotator, the cable winds about it to take up the slack resulting from the movement of hte reciprocator. The rotator may be cylindrical or irregular in cross sectional area for example corrugated, conical, eccentric, all depending upon the desired relationship between it and the reciprocator.

The reciprocator and the rotator are generally in alignment and have generally the same longitudinal axis. The cable is anchored at one end on the rotator, free to wrap around it and at the other end is anchored on the reciprocator at a point further removed from the axis of rotation of the rotator than is its anchorage so that as the rotator moves without rotating toward the rotator, the cable may wrap around the rotator and permit the hair spring to move the indicator accordingly.

The angle of rotation bears a direct relationship to the linear movement. If the cable is long enough and the reciprocator moves far enough to pay out cable enough, the spring may wind the cable around the rotator not once but several times so it becomes possible to associate an indicator with the rotator to read on an unusually wide range of displacement.

The relationship between the rotator and the reciprocator may be reversed. The cable may hold the reciprocator against withdrawal. The rotator may be positively controlled to rotate, to draw in, or pay out the cable. When this happens the reciprocator may be moved toward and from the rotary member at the will of the operator or responsive to manipulation of the rotator.

The invention is illustrated more or less diagrammatically in the accompanying drawings, wherein.

Like parts are indicated by like numerals throughout the specification and drawings.

Figure 1:
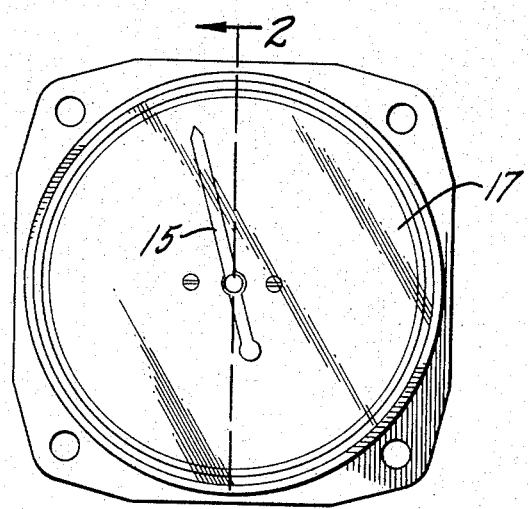
FIGURE 1 is a plan view of a gauge incorporating this invention.
Figure 3:
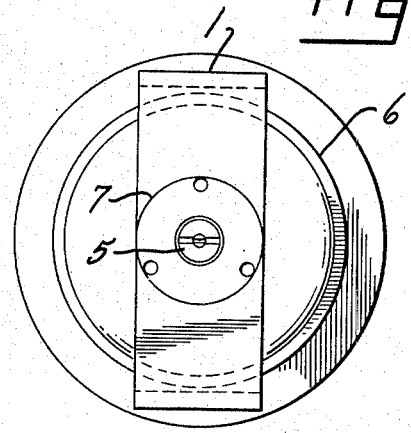
FIGURE 3 is a bottom plan view of FIGURE 1.
Figure 2:
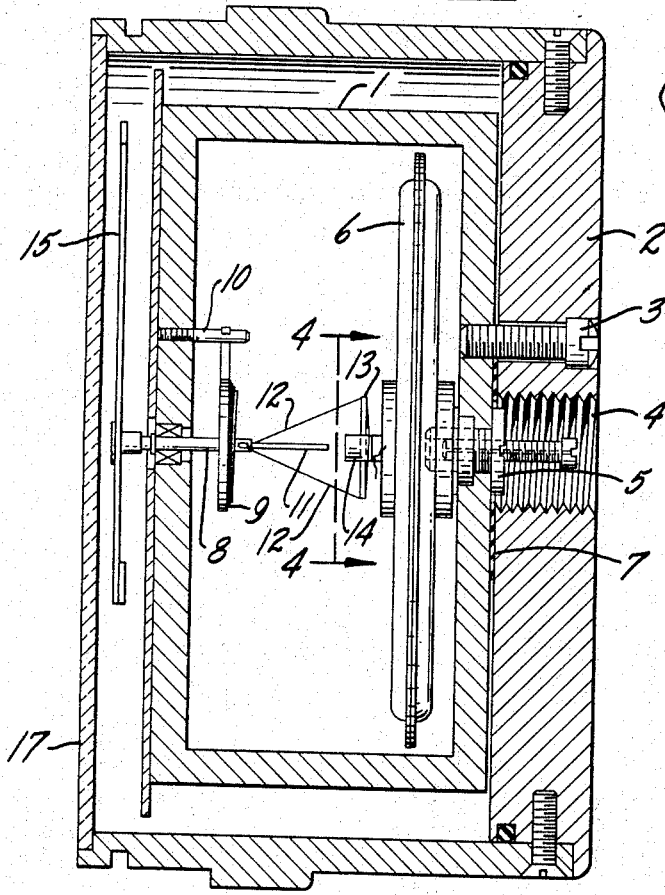
FIGURE 2 is a section along the line 2—2 of FIGURE 1.
Figure 4:
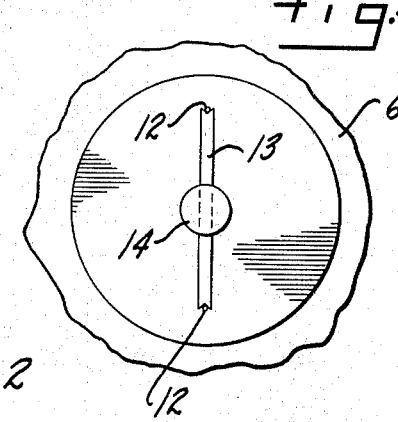
FIGURE 4 is a detail on an enlarged scale along the line 4—4 of FIGURE 2.
Figure 5:
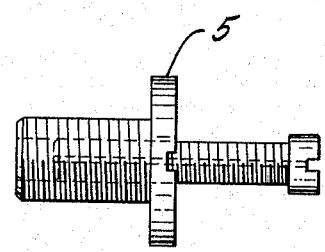
FIGURE 5 is a detail view on an enlarged scale.

This invention is illustrated as used in connection with a Pitot air pressure gauge on an airplane. Obviously it might be used for many other purposes. The rectangular open frame 1 is mounted on the base 2 by cap screws 3. The base carries an interiorly threaded sleeve 4 which may receive a pressure hose connection, not illustrated. A tubular pin 5 is threaded in the frame 1 in register with the sleeve 4 and carries in gas tight connection therewith a bellows 6. Packing 7 interposed between the frame and the base makes a gas tight fit between the sleeve 4 and the bellows 6. As the pressure in the bellows 6 varies as a result of the Pitot tube connection not shown, the bellows will expand and contract in the usual manner.

Mounted on the frame 1 opposite to the pin 5 is a spindle 8 held against longitudinal displacement with respect to but free to rotate in the frame. The spindle is biased for unitary rotary direction by a hair spring 9 anchored at one end on the abutment pin 10, at the other end on the spindle. The spindle carries an elongated cylindrical pin, spindle or drum 11 concentric therewith, extending toward the bellows. Cables 12 are anchored at one end on the spindle 8, at the other end on the cross member 13 which is mounted on a stud 14 projecting from the bellows. The stud is free to move toward and from the spindle 8 but is held against rotation. The spindle 8 and the pin 11 are free to rotate and are held against longitudinal displacement.

The hair spring 9 tends to rotate the spindle 8 to twist the cables 12 around the pin 11 to exert a tension on the cables which tension limits the biased rotation of the spindle.

When pressure from the Pitot tube expands the bellows, it moves the stud 14 toward the pin. This permits slack in the cables 12, the hair spring rotates the spindle 8 and the cable winds around the pin 11 as far as the tension in the cable permits. When pressure in the Pitot tube falls, the bellows collapses, the stud moves back away from the pin and the cable is unwound.

To balance the apparatus, two cables are illustrated. One or more would work equally well. Each cable is anchored on the spindle or rotator relatively near its center of rotation. Each cable is anchored on an arm 13 or any other element on the stud or reciprocator at a point relatively far from the center of rotation of the spindle. The spindle carries a needle 15 which rotates with it behind the dial 17 on the housing 2. The arm 13 may be a wheel or a disk or a plate and it is positively held against rotation while free to move with the stud toward and from the spindle to pay out or draw in the cable to permit it to wind or cause it to unwind from the pin. The pin may be cylindrical or eccentric or irregular as the case may be depending upon the relation desired between the reciprocating stud and the rotating spindle.

The length of the cable and the winding of the cable about the pin or the cylindrical rotating member may be such as to permit rotary movement of the needle through more than 360 degrees without any back lash or lost motion because the cable under the conditions of operation while flexible is extensible. It may be made for instance of silk treated or coated to make it immune to temperature or weather or moisture variations.

Assuming that the rotator is cylindrical, as it rotates and the cable wraps or unwraps about the periphery thereof, the radial distance between the axis of rotation and the point at which the cable leaves the periphery of the cylinder remains constant but the effective distance, the height from the reciprocator to the point at which the cable leaves the cylinder will vary in consonance with the rotation of the cylinder and the longitudinal movement of the reciprocator. The two radii are fixed. The distance or height between the point where the cable leaves contact with the cylinder and the lower anchorage varies as rotation takes place. The length of cable between the point of contact with the cylinders and the anchorage will also vary. It is possible to mathematically calculate the relationship between the longitudinal movement of the reciprocator and the angular position of an indicator carried by the cylinder so that the dial or the indicating means may be calibrated in accordance with the mathematical calculations of the designer.

The length of the cable, the distance between the reciprocator and the rotator, the diameter of the rotator and the distance between the anchorage on the reciprocator and the center of rotation may be selected and adjusted so that the maximum excursion of the reciprocator may be reflected in angular rotation of the rotor at any desired point greater or less than 360 degrees.

The mechanical movement involving the rotator, the reciprocator and the cable joining them may be used to displace either the rotator or the reciprocator as desired. If power is applied to the rotator, it can raise or lower the reciprocator. If power is applied to the reciprocator, it can angularly displace the rotator.

Figure 6:
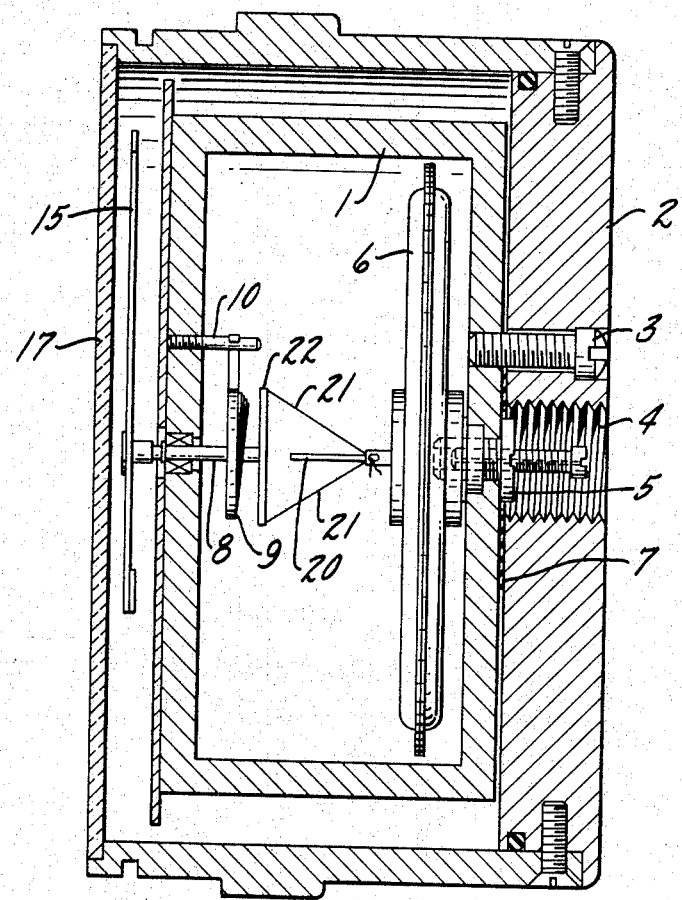
FIGURE 6 is a section similar to FIGURE 1 showing a modified form.

In the modified form of the device disclosed in FIGURE 6, the principle of operation is exactly the same as that of FIGURE 1 but in this case, the pin about which the cable is wound is held against rotation but free to reciprocate. As the pin or spindle moves toward and from the reciprocator, the length of cable between the pin and the rotator varies in consonance with such movement just as in the device of FIGURE 1. The difference is that the bellows 6 carries the pin 20 upon which is anchored the cable or cables 21 which lead up to the rotating plate 22, the rotating plate being rotated under the influence of the spring 9 just as before. When the pin 20 moves up the cable 21 permits rotation of the plate 22. As the pin 20 moves down, it pulls on the cable 21 to rotate the plate 22 in the opposite direction against the hair spring 9.

We claim:

1. In combination, a rotator member held against longitudinal movement along and free to rotate about an axis of rotation, means for rotating said member, a reciprocator member held against rotation about and movable along an axis generally aligned with the axis of rotation, one of said members having an elongated body in general alignment with said axis, the other of said members having cable-securing means offset from the alignment of said axis to an extent radially outside the maximum radial extent of said body, a flexible generally inextensible cable anchored at one end to said body and at the other end to said cable-securing means, the cable being free to wind about said body upon relative rotation of said members, to vary the length of cable between the periphery of the body and its anchorage at said cable-securing means.

2. In combination, a generally cylindrical rotator held against longitudinal movement along and free to rotate about an axis of rotation, means for rotating it, a reciprocator held against rotation about and movable along an axis generally aligned with the axis of rotation, a flexible generally inextensible cable anchored at one end on the rotator and at the other end on the reciprocator, the radial distance between the anchorage of the cable on the reciprocator and the axis of rotation being substantially greater than the radial distance between the anchorage of the cable on the rotator and the axis of rotation, the cable being free to wind about the rotator as it rotates, to vary the length of cable between the periphery of the rotator and its anchorage on the reciprocator.

3. In combination, a rotator held against longitudinal movement along and free to rotate about an axis of rotation, a reciprocator held against rotation about and movable along an axis generally aligned with the axis of rotation, a flexible generally inextensible cable anchored at one end on the rotator and at the other end on the reciprocator, the radial distance between the anchorage of the cable on the reciprocator and the axis of rotation being substantially greater than the radial distance between the anchorage of the cable on the rotator and the axis of rotation, the cable being free to wind about the rotator as it rotates, to vary the length of cable between the periphery of the rotator and its anchorage on the reciprocator, Yielding means for biasing the rotator for uni-directional rotation to wind the cable around the rotator to take up the slack as the distance between the rotator and the reciprocator decreases.

4. In combination, a rotator held against longitudinal movement along and free to rotate about an axis of rotation, means for rotating it, a reciprocator held against rotation about and movable along an axis generally aligned with the axis of rotation, a flexible generally inextensible cable anchored at one end on the rotator and at the other end on the reciprocator, the radial distance between the anchorage of the cable on the reciprocator and the axis of rotation being substantially greater than the radial distance between the anchorage of the cable on the rotator and the axis of rotation, the cable being free to wind about the rotator as it rotates, to vary the length of cable between the periphery of the rotator and its anchorage on the reciprocator, the rotator being generally cylindrical and extending toward the reciprocator a distance such that at all angular positions of the rotator the cable is wrapped around it.

5. A gauge including a rotator held against longitudinal movement along and free to rotate about an axis of rotation, an indicator carried by and rotatable therewith, yielding means for biasing the rotator for uni-directional rotation through an angle of over 360 degrees, a reciprocator movable toward and from the rotator along a path generally aligned with the axis of rotation and held against rotation about such path, means for displacing the reciprocator responsive to conditions which are to be indicated by the gauge, a cable anchored at one end on the reciprocator and at the other end on the rotator, the radial distance between the point of contact of the cable with the periphery of the rotator being much less than the distance between the anchorage of the cable on the reciprocator and the axis of rotation thereof.

6. A gauge including a rotator held against longitudinal movement along and free to rotate about an axis of rotation, an indicating element carried thereby and rotatable therewith, yielding means for biasing the rotator for uni-directional angular rotation, a reciprocator movable toward and from the rotator along a path generally aligned with the axis of rotation and held against rotation about such path, means for displacing the reciprocator responsive to conditions which are to be indicated by the gauge, a cable anchored at one end on the reciprocator and at the other end on the rotator, the radial distance between the point of contact of the cable with the periphery of the rotator being much less than the distance between the anchorage of the cable on the reciprocator and the axis of rotation thereof.

7. A gauge including a rotator held against longitudinal movement along and free to rotate about an axis of rotation, an indicating element carried thereby and rotatable therewith, yielding means for biasing the rotator for uni-directional angular rotation, a reciprocator movable toward and from the rotator along a path generally aligned with the axis of rotation and held against rotation about such path, means for displacing the reciprocator responsive to conditions which are to be indicated by the gauge, a cable anchored at one end on the reciprocator and at the other end on the rotator, the radial distance between the point of contact of the cable with the periphery of the rotator being much less than the distance between the anchorage of the cable on the reciprocator and the axis of rotation thereof,
the cable being free to rotate around the rotator as the reciprocator moves toward the rotator and the biasing means rotates the rotator to take up the slack and maintain tension on the cable.

8. A gauge, including a drum, mounted for rotary movement about and held against axial movement along a longitudinal axis, a base member movable along a path in general alignment with the longitudinal axis of the drum and held against rotation about its path of movement, a tension cable anchored on the base member at a point outside of the periphery of the drum, inclined to the drum axis extending upwardly and inwardly to anchorage upon the drum, yielding means tending to rotate the drum to wind the cable thereabout, means for moving the base member along its path of movement toward the drum to permit the yielding means to wind the cable thereon.

9. A gauge, including a drum, mounted for rotary movement about and held against axial movement along a longitudinal axis, a base member movable along a path in general alignment with the longitudinal axis of the drum and held against rotation about its path of movement, a tension cable anchored on the base member at a point outside of the periphery of the drum, inclined to the drum axis extending upwardly and inwardly to anchorage upon the drum, yielding means tending to rotate the drum to wind the cable thereabout, means for moving the base member along its path of movement toward the drum to permit the yielding means to wind the cable thereon, the yielding means being adapted to wind the cable about the drum as the abutment member moves upward and to permit the cable to unwind from the drum as the abutment member moves downward.

10. In combination, a member rotatable about a longitudinal axis and held against longitudinal movement along said axis, a longitudinally movable member, means for displacing it toward and from the rotatable member along a path generally aligned with the axis of rotation of the rotatable member, yielding means for biasing the rotatable member for uni-directional angular movement, tension means anchored at one end on the longitudinally movable member and anchored at the other end on the rotatable member and free to wrap around the rotatable member as the longitudinal member moves toward the rotatable member to permit the yielding means to rotate the rotatable member.

11. In combination, a rotator held against longitudinal movement along and free to rotate about an axis of rotation, means for rotating it, a reciprocator held against rotation about and movable along an axis generally aligned with the axis of rotation, a flexible generally inextensible cable anchored at one end on the rotator and at the other end on the reciprocator, the radial distance between the anchorage of the cable on the reciprocator and the axis of rotation being substantially different from the radial distance between the anchorage of the cable on the rotator and the axis of rotation.

12. In combination, a rotator held against longitudinal movement along and free to rotate about an axis of rotation, means for biasing it for rotation in one direction, a reciprocator held against rotation about and movable along an axis generally aligned with the axis of rotation, a flexible generally inextensible cable anchored at one end on the rotator and at the other end on the reciprocator, the radial distance between the anchorage of the cable on the reciprocator and the axis of rotation being substantially different from the radial distance between the anchorage of the cable on the rotator and the axis of rotation.

13. In combination, a rotator held against longitudinal movement along and free to rotate about an axis of rotation, means for rotating it, a reciprocator, held against rotation about and movable along an axis generally aligned with the axis of rotation, a flexible generally inextensible cable anchored at one end on the rotator and at the other end on the reciprocator, the radial distance between the anchorage of the cable on the reciprocator and the axis of rotation being substantially different from the radial distance between the anchorage of the cable on the rotator and the axis of rotation,
the cable being free to wind about that element of the combination of reciprocator and rotator which is nearest to the center of rotation as the length of cable between the rotator and the reciprocator varies.

14. In combination, a rotator held against longitudinal movement along and free to rotate about an axis of rotation, means for biasing it for rotation in one direction, a reciprocator held against rotation about and movable along an axis generally aligned with the axis of rotation, a flexible generally inextensible cable anchored at one end on the rotator and at the other end on the reciprocator, the radial distance between the anchorage of the cable on the reciprocator and the axis of rotation being substantially different from the radial distance between the anchorage of the cable on the rotator and the axis of rotation,
the cable being free to wind about that element of the combination of reciprocator and rotator which is nearest to the center of rotation as the length of cable between the rotator and the reciprocator varies.

References Cited

UNITED STATES PATENTS

| | | | |
|---|---|---|---|
| 1,818,169 | 8/1931 | Stalder | 73—410 |
| 2,636,394 | 4/1953 | Melchior | 74—89.2 |

MILTON KAUFMAN, *Primary Examiner.*